(12) United States Patent
Megiddo

(10) Patent No.: US 7,661,446 B2
(45) Date of Patent: Feb. 16, 2010

(54) METHOD FOR OPERATING AND MANAGING A RE-FUELING BUSINESS

(75) Inventor: Nimrod Megiddo, Palo Alto, CA (US)

(73) Assignee: International Business Machines Corporation, Armonk, NY (US)

( * ) Notice: Subject to any disclaimer, the term of this patent is extended or adjusted under 35 U.S.C. 154(b) by 283 days.

(21) Appl. No.: 11/768,516

(22) Filed: Jun. 26, 2007

(65) Prior Publication Data
US 2009/0000691 A1    Jan. 1, 2009

(51) Int. Cl.
*B65B 1/04* (2006.01)

(52) U.S. Cl. .............................. 141/1; 141/83; 141/95; 141/198

(58) Field of Classification Search ............. 141/1, 141/2, 67, 83, 94, 95, 98, 192, 198, 232
See application file for complete search history.

(56) References Cited

U.S. PATENT DOCUMENTS

| | | | |
|---|---|---|---|
| 3,650,303 A | 3/1972 | Chambers et al. | |
| 3,814,148 A | 6/1974 | Wostl | |
| 4,988,020 A | 1/1991 | Webb | |
| 5,901,869 A | 5/1999 | Ohmura et al. | |
| 6,016,834 A * | 1/2000 | Leidl | 137/571 |
| 6,065,511 A | 5/2000 | McClintock | |
| 6,336,362 B1 * | 1/2002 | Duenas | 73/313 |
| 6,817,482 B1 * | 11/2004 | Borter | 220/725 |
| 7,185,683 B2 * | 3/2007 | Hillam et al. | 141/198 |
| 7,441,569 B2 * | 10/2008 | Lease | 141/95 |
| 2003/0019149 A1 | 1/2003 | Waynick | |
| 2006/0015543 A1 * | 1/2006 | Humphrey | 707/202 |
| 2007/0084523 A1 * | 4/2007 | McLean et al. | 141/231 |

* cited by examiner

*Primary Examiner*—Timothy L Maust
(74) *Attorney, Agent, or Firm*—Cantor Colburn LLP; Leonard Guzman

(57) ABSTRACT

Disclosed is a method for operating and managing a re-fueling business. The method includes contracting with a customer to fuel a fuel consuming vehicle for the customer, providing a locking device with a fuel tank of the vehicle, the locking device being unlockable by the re-fueling business and the customer, and transporting a fuel containing structure from the re-fueling business to various locations of the customer's vehicle whenever a fueling of the vehicle is desirable to the business and the customer, the locations being remote of the business, unlocking the locking device of the fuel tank upon arrival at the locations, filling the fuel tank with an amount of fuel from the fuel containing structure upon the transporting of the fuel container to the locations, and re-locking the locking device after filling the fuel tank with the amount of fuel.

1 Claim, 1 Drawing Sheet

METHOD FOR OPERATING AND MANAGING A RE-FUELING BUSINESS

BACKGROUND OF THE INVENTION

1. Field of the Invention

The disclosure relates generally to a method for operating and managing a re-fueling business, and more particularly to a method for operating and managing a re-fueling business for fuel consuming vehicles.

2. Description of the Background

Most drivers re-fuel their vehicles at retail gas stations. Sometimes it is necessary to spend a significant amount of time waiting in line to buy gas. Even self-service sometimes requires a significant amount of time. Additionally, gas stations are typically located in areas where real estate is expensive, such a densely populated urban and sub-urban areas. The cost of real estate in these areas is factored into the retail price of gas, which seems to be ever increasing. At least in part because of these factors it is not only frustratingly time consuming to re-fuel a vehicle, but it is also expensive.

Accordingly, a method for supplying fuel to customers under less time consuming and expensive conditions would be desirable.

SUMMARY OF THE INVENTION

Disclosed is a method for operating and managing a re-fueling business. The method includes contracting with a customer to fuel a fuel consuming vehicle for the customer, providing a locking device with a fuel tank of the vehicle, the locking device being unlockable by the re-fueling business and the customer, and transporting a fuel containing structure from the re-fueling business to various locations of the customer's vehicle whenever a fueling of the vehicle is desirable to the business and the customer, the locations being remote of the business. The method also includes unlocking the locking device of the fuel tank upon arrival at the locations, filling the fuel tank with an amount of fuel from the fuel containing structure upon the transporting of the fuel container to the locations, and re-locking the locking device after filling the fuel tank with the amount of fuel.

BRIEF DESCRIPTION OF THE FIGURES

The foregoing and other features and advantages of the present invention should be more fully understood from the following detailed description of illustrative embodiments taken in conjunction with the accompanying Figures in which like elements are numbered alike in the several Figures.

DETAILED DESCRIPTION

Figure 1:
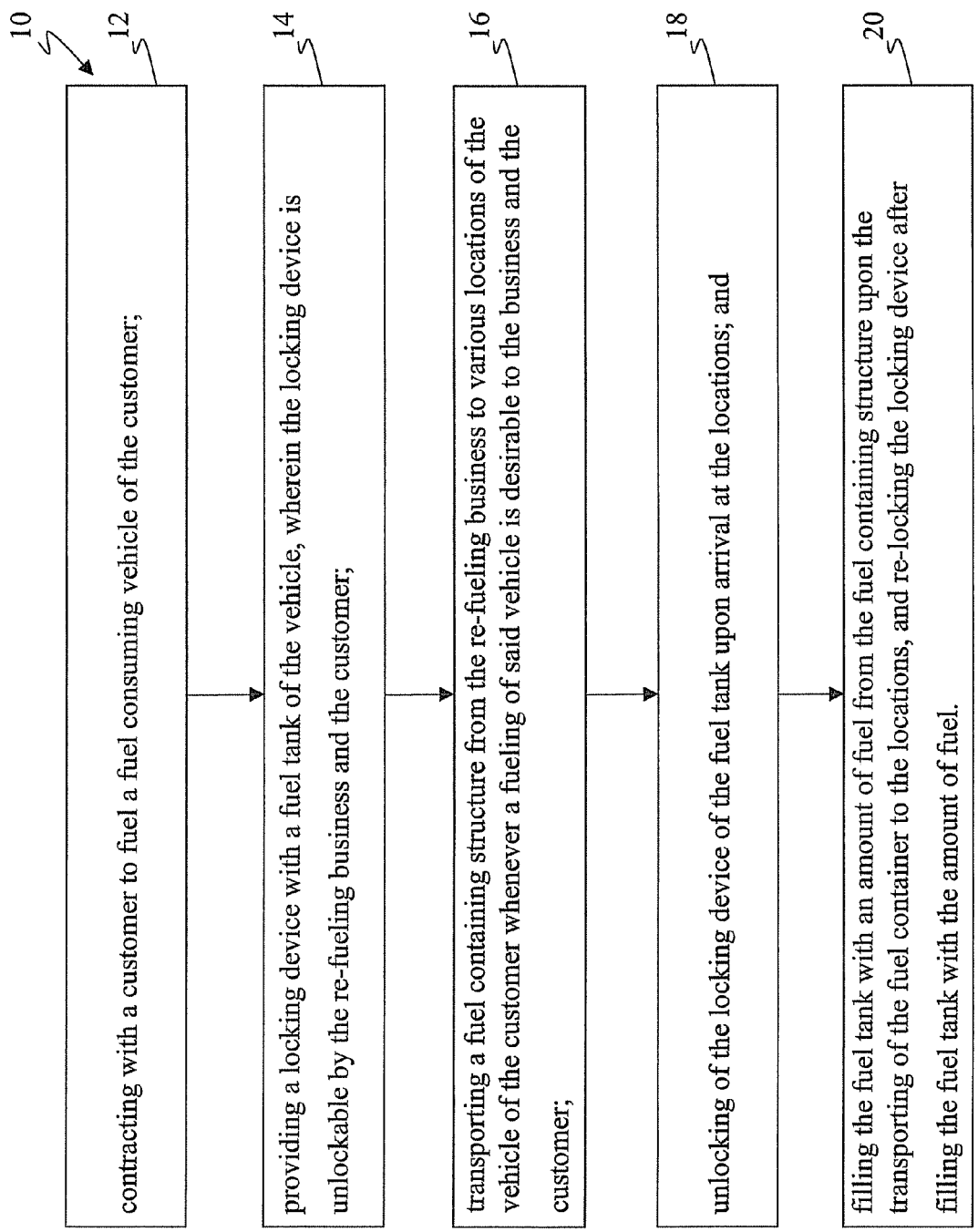
FIG. 1 is a block diagram illustrating a method for operating and managing a re-fueling business.

Referring to FIG. 1, a method 10 for operating and managing a re-fueling business is illustrated and includes contracting with a customer to fuel a fuel consuming vehicle of the customer, as shown in operational block 12. In contracting with the customer, the supplier is authorized by the customer to fill up the tank of the customer's car at any time and place. There can be various kinds of contracts depending on the customer's preferences, which will be discussed in greater detail below.

The method 10 also includes providing a locking device with a fuel tank of the vehicle, wherein the locking device is unlockable by the re-fueling business and the customer, as shown in operational block 14. The customer may agree to install this locking device on the gas tank cap of his vehicle. Opening of the device may be achieved by the business or customer via a magnetic card, a digital code, wireless key device, or any other desirable locking mechanism.

The method 10 further includes transporting a fuel containing structure from the re-fueling business to various locations of the vehicle of the customer whenever a fueling of said vehicle is desirable to the business and the customer, as shown in operational block 16. The locations to which the business transports the fuel containing structure are located remote of the business, such as the customer's home parking area or office parking area. The fuel container may be transported to the various locations via a truck with which it is in association. The trucks employed by the business may be medium-sized trucks and/or trucks of various sizes in combination. For example, a larger truck carrying a larger fuel container may travel together with a smaller truck including a smaller fuel container. In particular neighborhoods, the smaller truck would refuel customer vehicles while the bigger truck waits outside of the neighborhood. In this scenario, the larger truck provides a large fuel source at which the smaller truck fills its container, which the smaller truck then transports to the vehicles of the neighborhood for fueling.

Once the fuel container reaches the location of the customer's vehicle, a business entity, such as an employee or computing resource of the business, unlocks the locking device disposed with the tank cap of the customer's vehicle. This unlocking is represented in the method 10 at operational block 18, which illustrates an unlocking of the locking device of the fuel tank upon arrival at the locations.

The method 10 additionally includes filling the fuel tank with an amount of fuel from the fuel containing structure upon the transporting of the fuel container to the locations, and re-locking the locking device after filling the fuel tank with the amount of fuel, as shown in operational block 20. With this fueling of the vehicle at the remote location, such as customer's home parking area or office parking area, fuel is delivered to the customer in a manner that saves the customer time, and eliminates the costs to the business that relate to gas station maintenance.

It should be appreciated that the business may also provide a meter to the customer, wherein the meter records a total amount of fuel that the business pumps into the customer's vehicle during a particular filling (which is likely one filling of many). The meter may be linked to a customer's credit card, and may activate an automatic charge to the customer's card according to the total amount of fuel supplied to the customer's vehicle during a filling. Part of the contracting discussed in operational block 12 may also include negotiating and setting an overall or per filling charge limit on the customer's credit card. In addition, the contracting discussed in operational block 12 may specify conditions in terms of locations, fuel levels, price per gallon, etc., under which the business is authorized or not authorized to fill the customer's vehicle with a particular (or any) amount of fuel.

It should also be appreciated that the business may provide to the customer a transceiver that is configured to communicate with a computing resource of the business (the resource may be located at a central business location and/or be portable and travel with the transported fuel containers). This transceiver may receive information pertaining to vehicle location and fuel level from the GPS of the customer's vehicle, and automatically transmit this information to the computing resource. This transceiver could then employ cellular phone communication, wherein fuel level and location information is read into chip memory of the transceiver, and a cellular phone associated with the transceiver calls the computing resource and transmits the information. Such calls can be placed according to various polices. For example, calls can be placed when the fuel level reaches predetermined thresholds at fixed time intervals, after a customer has refueled on his or her own, and/or when the vehicle is located at a particular location. The business may use the location and fuel level information it receives to determine a desirable and cost effective time for filling the tank(s) of customer's vehicle(s) with a desirable amount of fuel. Of course, the customer may also link his or her own computing resource with the computing resource of the business, and manually transmit information regarding fuel level and location to the business via this link.

It should further be appreciated that the business may optimize trips to customer locations (i.e. number of times the business transports fuel to the customer) by minimizing travel time, refueling frequencies, storage locations, prices, and other aspects involved with transporting fuel. This optimization will hold down costs such as the wholesale cost of the fuel and delivery costs. The delivery costs are the travel costs, the cost of maintaining the fleet and facilities, and the cost of labor. A large-scale optimization model can be developed for optimizing the schedule of deliveries. The model, which can be formulated via an analyzing of the location and fuel level information transmitted to the computing resource over time, can be used to decide whether or not to visit certain customers depending on their locations and the estimated amounts of fuel they need. This is a stochastic multi-vehicle routing problem with costs and benefits. A log of visits to the customer's site can also be kept by the computing resource, and used to adapt a business refueling policy to past patterns. If the customer does not report the precise level of fuel in the tank, the optimization model may rely on a prediction model to learn the daily fuel consumption of the customer (depending on the day of the week, season, etc.) in order to estimate the amount of fuel that currently could be pumped into the vehicle tank(s) of the customer.

It should finally be appreciated that a customer contracting with the business for the service discussed above may of course at any time pump gas into his/her own car without coordination with the supplier. As was mentioned briefly above, this activity may also be automatically transmitted to the computing resource of the business via the automated cellular phone call discussed above.

While the invention has been described with reference to an exemplary embodiment, it should be understood by those skilled in the art that various changes may be made and equivalents may be substituted for elements thereof without departing from the scope of the invention. In addition, many modifications may be made to adapt a particular situation or substance to the teachings of the invention without departing from the scope thereof. Therefore, it is important that the invention not be limited to the particular embodiment disclosed as the best mode contemplated for carrying out this invention, but that the invention will include all embodiments falling within the scope of the apportioned claims. Moreover, unless specifically stated any use of the terms first, second, etc. do not denote any order or importance, but rather the terms first, second, etc. are used to distinguish one element from another.

What is claimed is:

1. A method for operating and managing a re-fueling business, the method comprising:

contracting with a customer to fuel a fuel consuming automobile that said customer drives to and between various locations that include at least a first location and a second location;

providing a locking device with a fuel tank of said automobile, said locking device being unlockable by the re-fueling business and the customer;

transporting a fuel containing structure from the re-fueling business to both said first and said second locations of said automobile whenever a fueling of said automobile is desirable to the business and said customer, said locations being remote of the business;

unlocking said locking device of said fuel tank upon arrival at said locations;

filling said fuel tank with an amount of fuel from said fuel containing structure upon said transporting of said fuel container to said locations, and re-locking said locking device after filling said fuel tank with said amount of fuel, wherein said transporting and said filling occurs on multiple occasions;

providing said automobile of said customer with a transceiver that is in communication with a computing resource located at the business, and communicating location information pertaining to said locations and fuel information fuel level of said fuel tank from said transceiver to said computing resource;

scheduling said transporting to said locations based on an analyzing of said location information and said fuel information; and minimizing costs of said transporting associated with travel time and travel frequency based on said analyzing of said of said location information and said fuel information.

* * * * *